US008042275B2

(12) United States Patent
Sergyeyenko (10) Patent No.: US 8,042,275 B2
(45) Date of Patent: Oct. 25, 2011

(54) SCOOP AND BLADE GUARD FOR HEDGE TRIMMER (75) Inventor: Oleksiy Sergyeyenko, Brockville (CA)

(73) Assignee: Black & Decker Inc., Newark, DE (US)

(*) Notice: Subject to any disclaimer, the term of this patent is extended or adjusted under 35 U.S.C. 154(b) by 697 days.

(21) Appl. No.: 12/117,224

(22) Filed: May 8, 2008

(65) Prior Publication Data
US 2009/0277014 A1 Nov. 12, 2009

(51) Int. Cl.
*B26B 19/00* (2006.01)
(52) U.S. Cl. .............................. 30/131; 30/132; 30/392
(58) Field of Classification Search .................. 30/124, 30/132, 216, 392, 131, 133; 206/234, 784, 206/349
See application file for complete search history.

(56) References Cited

U.S. PATENT DOCUMENTS

| 2,747,276 | A | | 5/1956 | Yatsko |
| 3,073,025 | A | | 1/1963 | Yatsko |
| 3,552,013 | A | * | 1/1971 | Stone ............................ 30/132 |
| 3,795,050 | A | | 3/1974 | Latsha |
| 3,916,521 | A | | 11/1975 | Sekelsky |
| 4,015,330 | A | * | 4/1977 | Popeil et al. .................... 30/124 |
| 4,071,951 | A | * | 2/1978 | Burns ............................ 30/132 |
| 4,127,938 | A | * | 12/1978 | Slingerland, Jr. ............... 30/132 |
| 4,597,178 | A | * | 7/1986 | Dolata et al. ................... 30/138 |
| 5,659,958 | A | | 8/1997 | Goings |
| 7,155,830 | B2 | * | 1/2007 | Sasaki et al. .................... 30/210 |
| 7,707,727 | B1 | * | 5/2010 | Szoke ............................ 30/199 |

FOREIGN PATENT DOCUMENTS

| EP | 0 653 274 B1 | 5/1995 |
| EP | 0 736 245 A1 | 10/1996 |
| EP | 1 859 672 A2 | 11/2007 |
| FR | 2 765 452 A1 | 1/1999 |
| GB | 2 289 203 A | 11/1995 |

* cited by examiner

*Primary Examiner* — Boyer D Ashley
*Assistant Examiner* — Omar Flores Sanchez
(74) *Attorney, Agent, or Firm* — Harness, Dickey & Pierce, P.L.C.

(57) ABSTRACT

A blade guard for a hedge trimmer that can cut trimmings from a hedge includes a cutting arm member with a first set of the cutting blades that extends laterally from the cutting arm member. The blade guard generally includes a first housing member and a second housing member movable between an open condition and a closed condition. A connecting member on the blade guard member that is operable to releasably couple to the cutting arm member. The first housing member and the second housing member in the open condition establish an opening between the first housing member and the second housing member. The blade guard in the open condition is operable to catch the trimmings in the opening between the first housing member and the second housing member. The blade guard in the closed condition is operable to cover the first set of the cutting blades.

24 Claims, 12 Drawing Sheets

SCOOP AND BLADE GUARD FOR HEDGE TRIMMER

FIELD

The present teachings relate to a blade guard and more particularly relate to a blade guard that covers all of the cutting blades on a hedge trimmer in a closed condition and can also serve as a scoop to catch clippings that can be cut by the hedge trimmer when the blade guard forms an opening in an open condition.

BACKGROUND

Typically, hedge trimmers can be used to trim hedges and other greenery around a residence or business. The cutting blades of the hedge trimmer remain exposed during use and storage. A blade guard can be used to cover the blades on the hedge trimmer and then must be removed before use of the hedge trimmer. During a hedge trimming operation, clippings from the hedge can drop to the ground while the user is trimming the hedge. When done trimming the hedge, the user can collect the clippings and then re-attach the blade guard to the hedge trimmer for storage.

SUMMARY

The present teachings generally include a blade guard for a hedge trimmer that can cut trimmings from a hedge. The hedge trimmer includes a cutting arm member with a first set of the cutting blades that extends laterally from the cutting arm member. The blade guard generally includes a first housing member and a second housing member movable between an open condition and a closed condition. A connecting member on the blade guard is operable to releasably couple to the cutting arm member of the hedge trimmer. The first housing member and the second housing member in the open condition establish an opening between the first housing member and the second housing member. The blade guard in the open condition is operable to catch the trimmings in the opening between the first housing member and the second housing member. The blade guard in the closed condition is operable to cover the first set of the cutting blades.

Further areas of applicability will become apparent from the description provided herein. It should be understood that the description and specific examples are intended for purposes of illustration only and are not intended to limit the scope of the present teachings.

DRAWINGS

The drawings described herein are for illustration purposes only and are not intended to limit the scope of the present teachings.

DETAILED DESCRIPTION

The following description is merely exemplary in nature and is not intended to limit the present teachings, their application or uses. It should be understood that throughout the drawings, corresponding reference numerals indicate like or corresponding parts and features.

Figure 1:
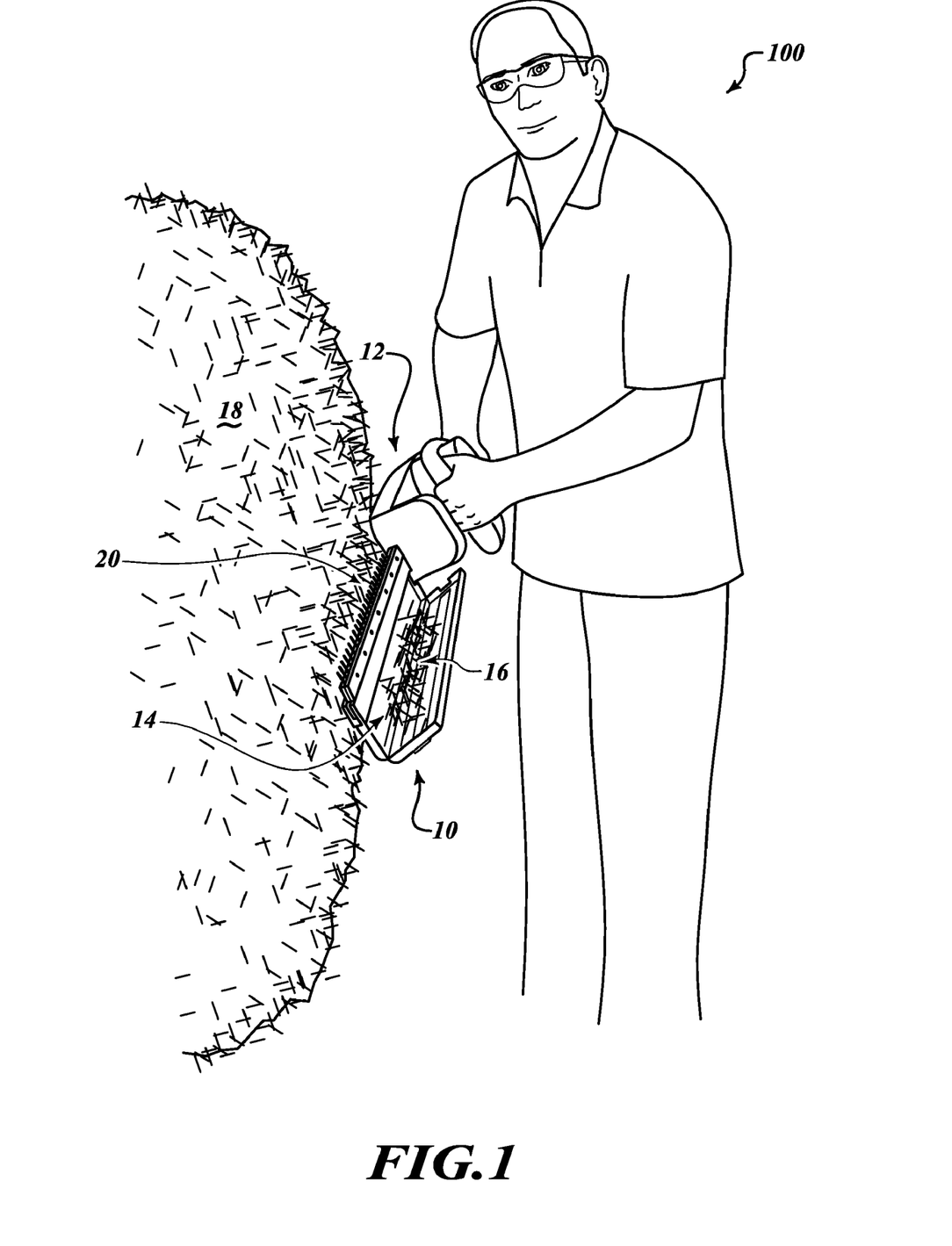
FIG. 1 is a perspective view of a user using a hedge trimmer with a blade guard in an open condition that can catch the trimmings from a hedge in a scoop formed by an opening of the blade guard in accordance with the present teachings.
Figure 6:
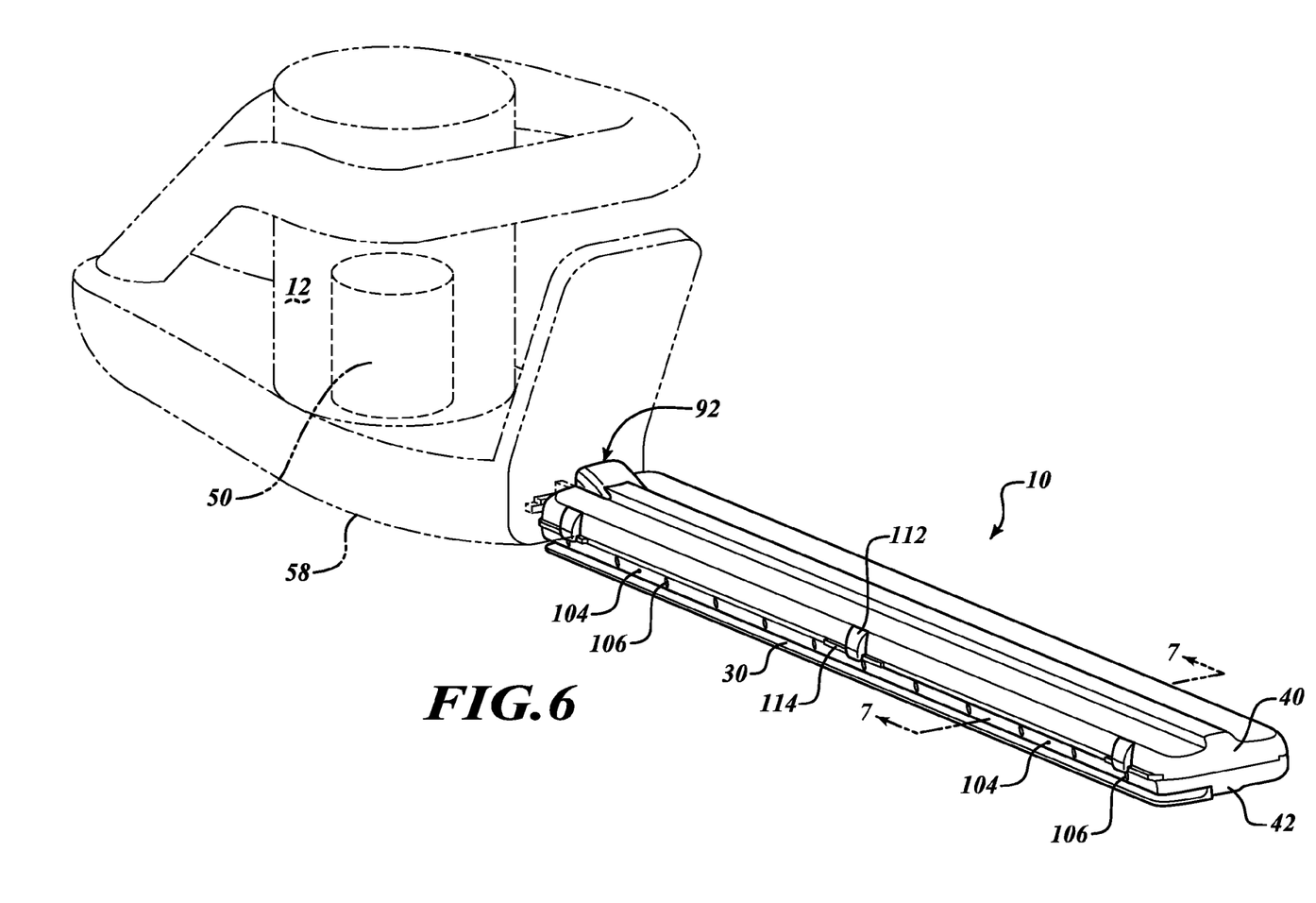
FIG. 6 is a perspective view of the blade guard in a closed condition that covers the first set and the second set of the cutting blades on the hedge trimmer in accordance with the present teachings.
Figure 8:
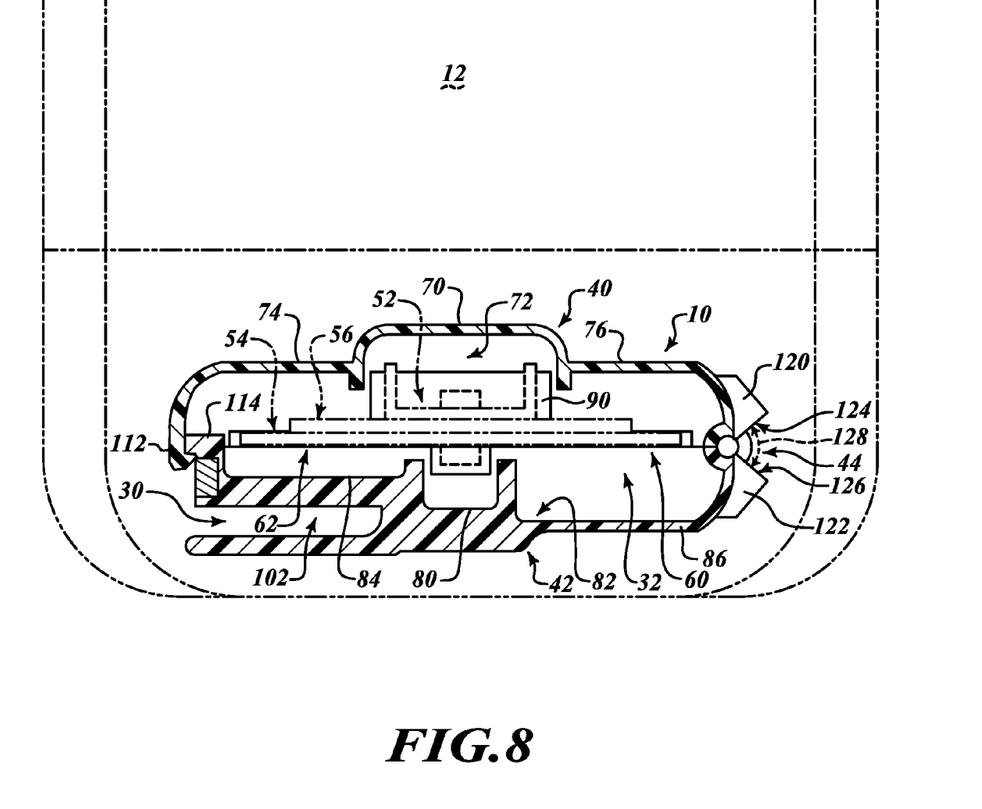
FIG. 8 is a cross-sectional view of the blade guard of FIG. 6 in accordance with the present teachings.

With reference to FIG. 1, the present teachings generally include a blade guard 10 for a hedge trimmer 12. The blade guard 10 in an open condition can be used as a scoop 14 to catch clippings 16 while the hedge trimmer 12 can be used to trim hedges 18 or other greenery. With reference to FIGS. 6 and 8, the blade guard 10 can also be used to cover all of the cutting blades 20 on the hedge trimmer 12 when the blade guard 10 is in a closed condition.

With reference to FIGS. 1, 3, 4 and 5, the hedge trimmer 12, in the open condition, can be removed from the blade guard 10 and reinserted into an attachment groove 30 (FIG. 5) so that the blade guard 10 can be used as the scoop 14 to catch the clippings 16, while the hedge trimmer 12 is used, as illustrated in FIG. 1. In doing so, the blade guard 10 in the open condition can provide an opening 32 that can form the scoop 14. The same opening 32 can also receive and be closed around the cutting blades 20 of the hedge trimmer 12 to contain all of the cutting blades 20, so as to not permit contact with the cutting blades 20 of the hedge trimmer 12.

Figure 4:
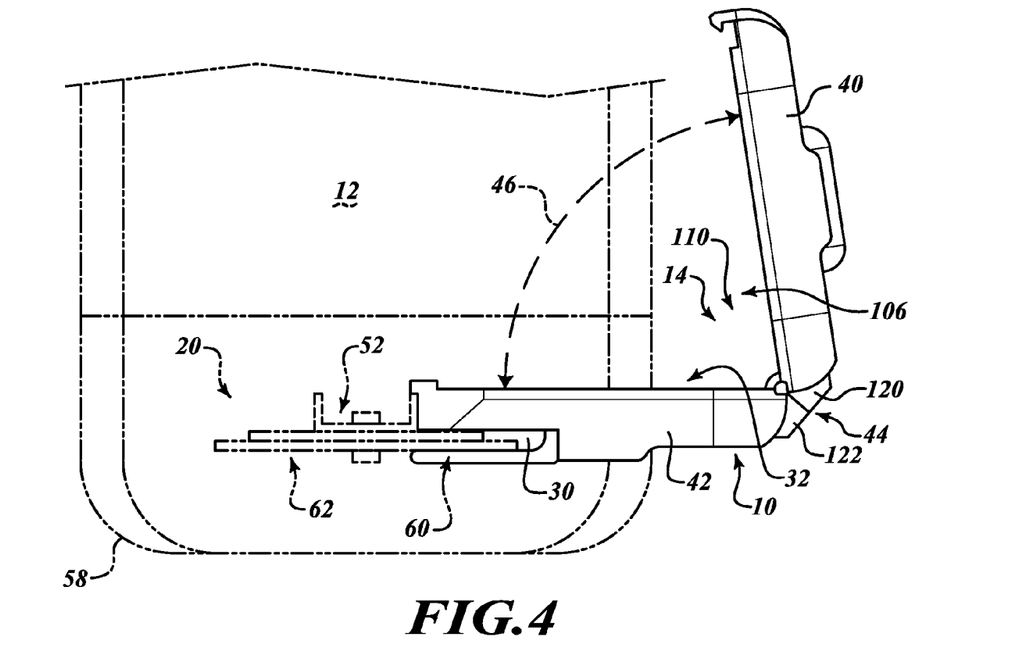
FIG. 4 is a front view of the blade guard attached to a cutting arm member of the hedge trimmer with the blade guard in the open condition in accordance with the present teachings.
Figure 5:
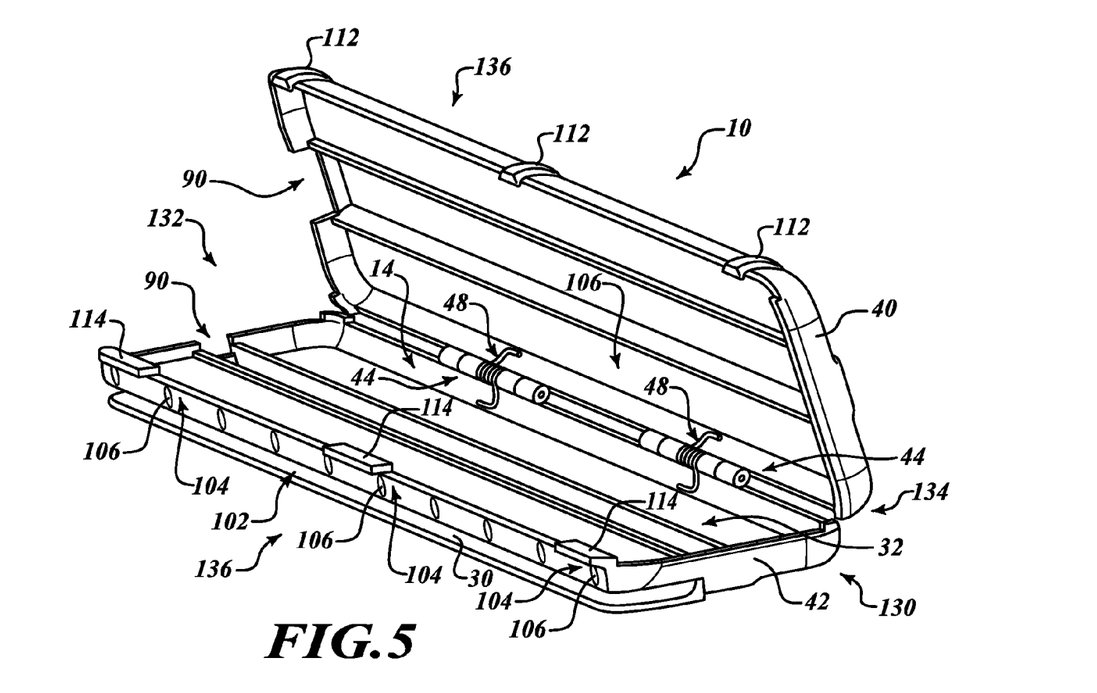
FIG. 5 is a perspective view of the blade guard in the open condition showing connecting members adjacent to an attachment groove in accordance with the present teachings.

With reference to FIG. 5, the blade guard 10 can include a first housing member 40 and a second housing member 42 that can be rotatably connected to one another. One or more hinge members 44 can permit the first housing member 40 and the second housing member 42 to pivot relative to one another. In one example, two hinge members 44 are implemented on the blade guard 10. The one or more hinge members 44 can be configured to suspend the first and second housing members 40, 42 at an angle 46 (FIG. 4) from one another to establish the opening 32 therebetween, which, in turn, can provide the scoop 14.

One or more spring members 48 can be disposed with each of the one or more hinge members 44 to bias the blade guard 10 in the open condition. With the one or more hinge members 44 and the one or more spring members 48, the blade guard 10 can be biased in the open condition so that the first and second housing members 40, 42 form the angle 46 that provides the opening 32 and can establish the scoop 14. By way of the above example, one spring member 48 can be implemented with each of the hinge members 44.

Figure 3:
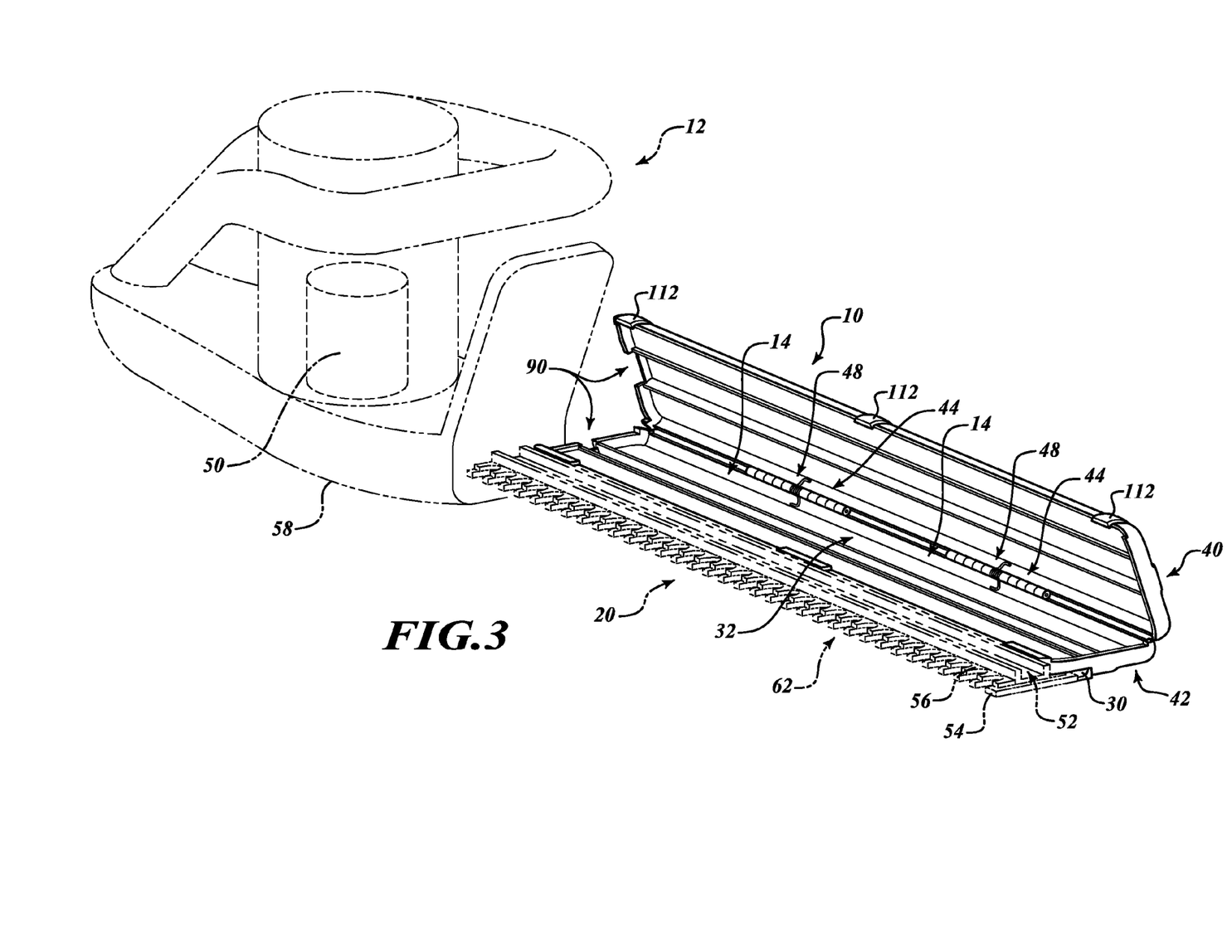
FIG. 3 is a perspective view of the blade guard attached to the hedge trimmer with the blade guard in an open condition in accordance with the present teachings.

With reference to FIG. 3, the hedge trimmer 12 can include a gasoline powered or electric powered motor 50 that can cause some of the cutting blades 20 on a cutting arm member 52 to move. In this regard, the cutting blades 20 include multiple fixed cutting blades 54 disposed among multiple moving blades 56, as is known in the art. As the multiple moving blades 56 move relative to the fixed blades 54, portions of the hedge 18 or other greenery can be cut between the cutting blades 20. Each of the moving blades 56 and the fixed blades 54 are operably connected to the cutting arm member 52.

Figure 10:
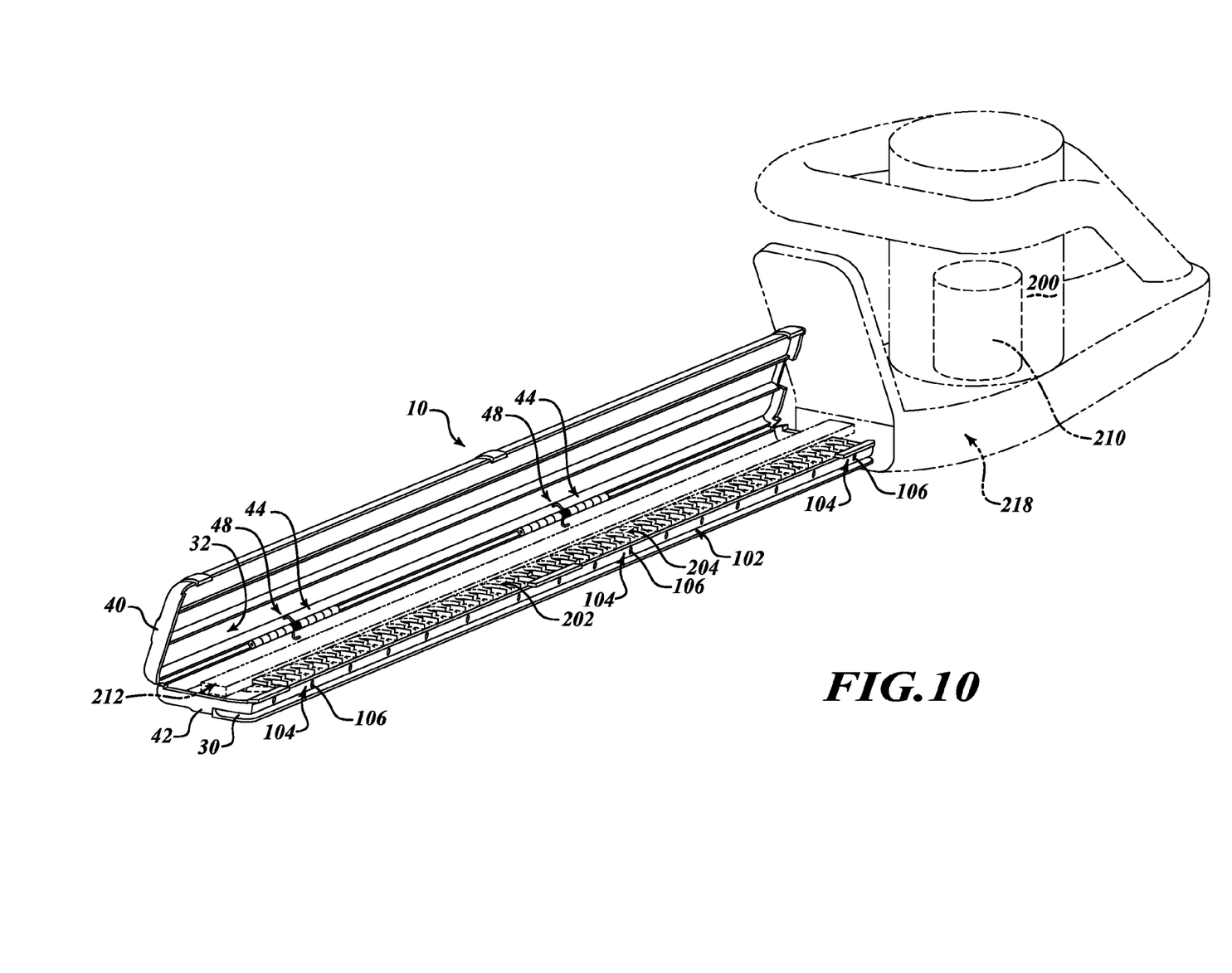
FIG. 10 is a perspective view of the blade guard in an open condition holding a hedge trimmer with one set of the cutting blades in the opening of the blade guard in accordance with the present teachings.
Figure 11:
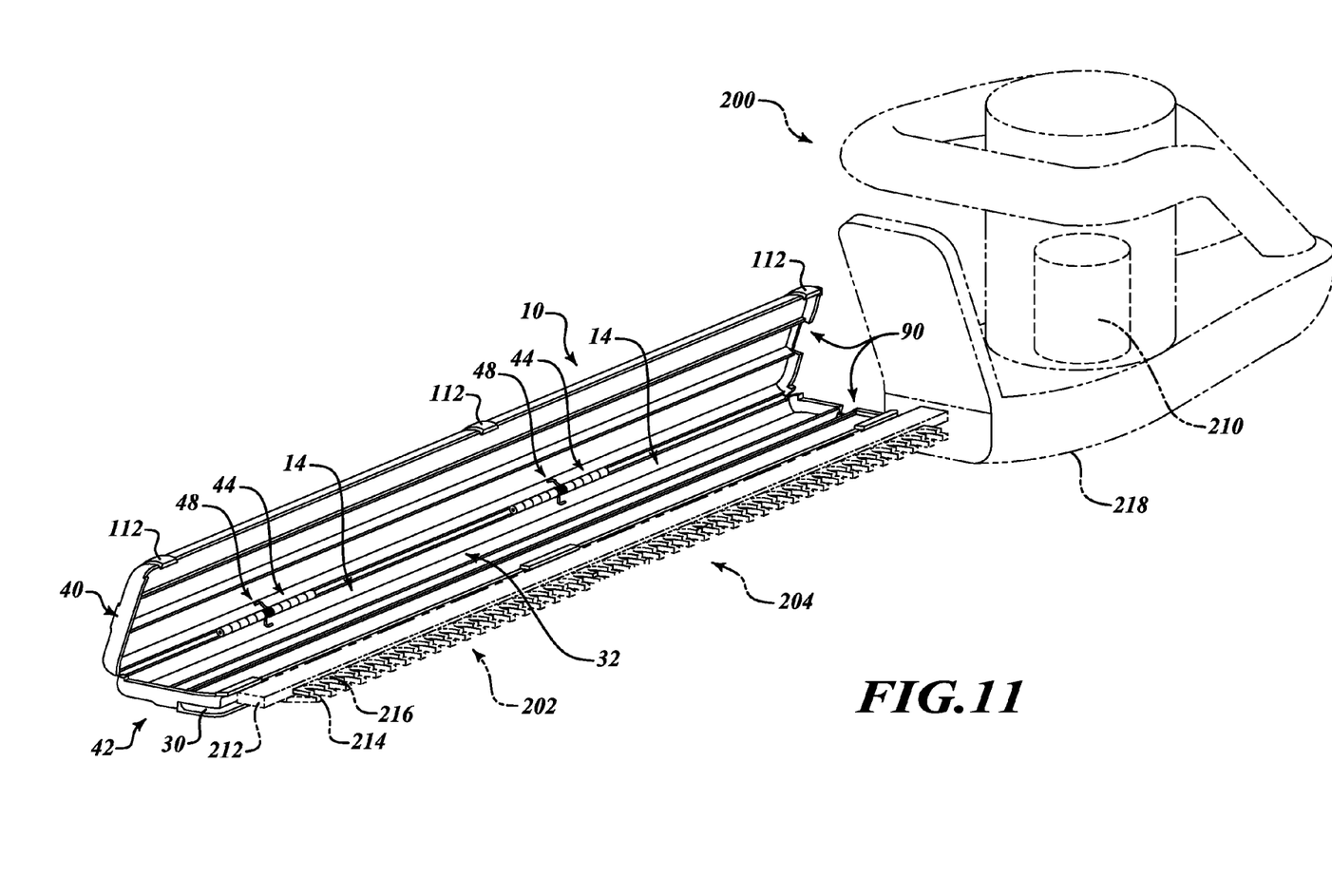
FIG. 11 is a perspective view of the blade guard attached to a cutting arm member of the hedge trimmer of FIG. 10 in accordance with the present teachings.
Figure 12:
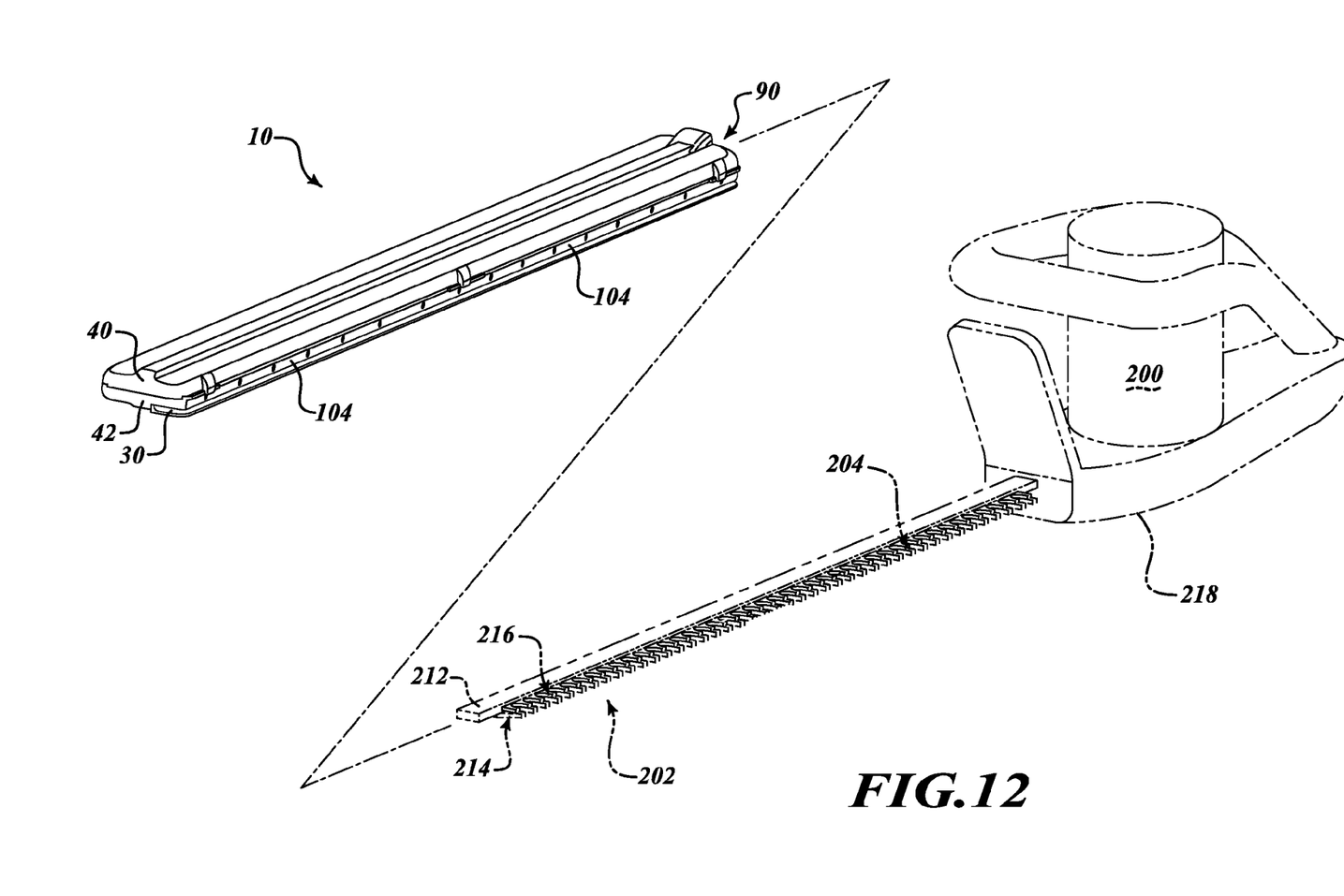
FIG. 12 is a perspective view of the blade guard in the closed condition being able to slide on and off the cutting arm member of the hedge trimmer of FIG. 10 in accordance with the present teachings.

The cutting arm member 52 can extend from a housing 58 of the hedge trimmer 12 that contains the motor 50. The moving blades 56 and the fixed blades 54 can provide a first set 60 of the cutting blades 20 (both fixed and moving blades 54, 56) that can extend laterally from the cutting arm member 52 and a second set 62 of the cutting blades 20 (both fixed and moving blades 54, 56) that can extend laterally in the opposite direction from the first set 60 of the cutting blades 20. It will be appreciated in light of the disclosure that the hedge trimmer 12 need not have two sets of the cutting blades 20. For example and as illustrated in FIGS. 10, 11 and 12, a hedge trimmer 200 can have a first set 202 of the cutting blades 204 and, as such, the hedge trimmer lacks additional sets of the cutting blades 204, as discussed herein.

Figure 7:
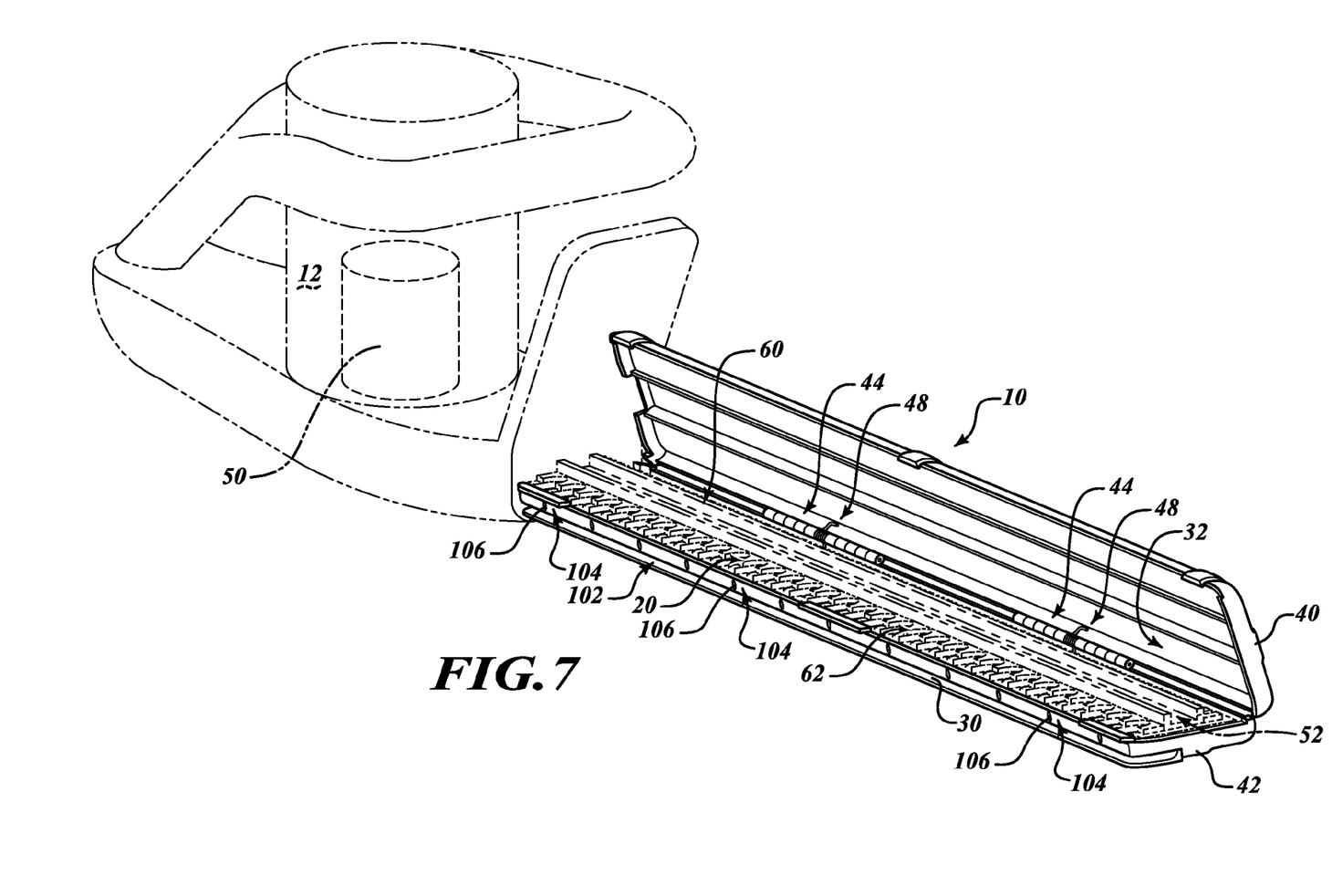
FIG. 7 is a perspective view of the blade guard in the open condition holding the cutting arm member and both the first set and the second set of the cutting blades of the hedge trimmer within the blade guard in accordance with the present teachings.

With reference to FIGS. 6, 7 and 8, the blade guard 10 can be configured to permit all of the cutting blades 20 of the hedge trimmer 12 to be placed between the first and the second housing members 40, 42 of the blade guard 10 so as to cover both the first set 60 and the second set 62 of the cutting blades 20 when the blade guard 10 is moved to the closed condition. With reference to FIG. 8, the first housing member 40 of the blade guard 10 can include a middle channel 70 on an interior surface 72 that can hold a portion of the cutting arm member 52. The middle channel 70 can be disposed between a first side channel 74 and a second side channel 76. When the middle channel 70 of the first housing member 40 receives the cutting arm member 52 of the hedge trimmer 12, the side channels 74, 76 can also receive the first set 60 and the second set 62 of the cutting blades 20 in each of the side channels 74, 76, respectively.

The second housing member 42 of the blade guard 10 can include a middle channel 80 on an interior surface 82 of the second housing member 42 that can hold a portion of the cutting arm member 52. The middle channel 80 on the second housing member 42 can be disposed between a first side channel 84 and a second side channel 86. When the middle channel 80 of the second housing member 42 receives a portion of the cutting arm member 52 of the hedge trimmer 12, the side channels 84, 86 of the second housing member 42 can also receive the first set 60 and the second set 62 of the cutting blades 20 in each of the side channels 84, 86, respectively.

Figure 9:
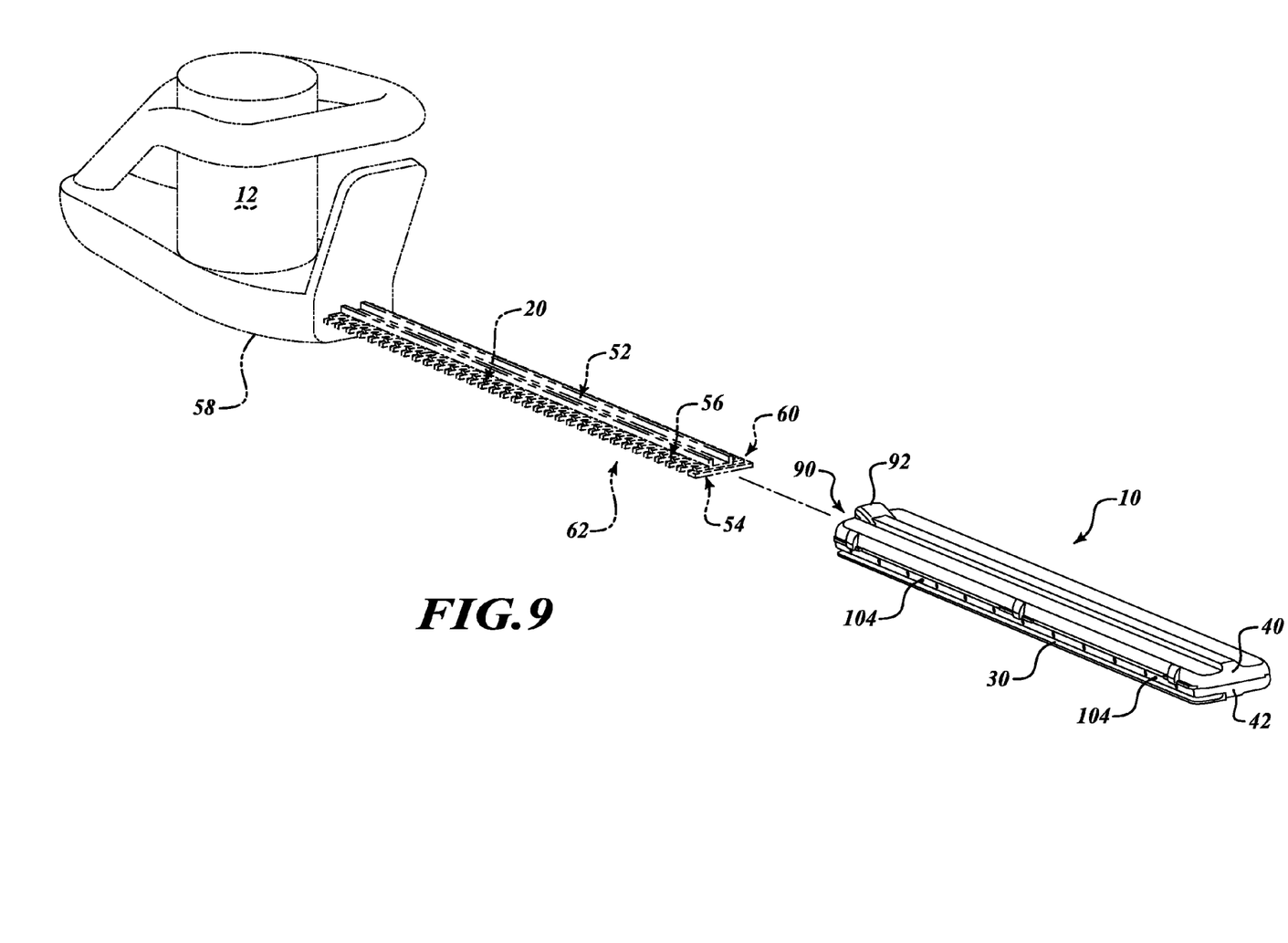
FIG. 9 is a perspective view of the blade guard being able to slide on and off the cutting arm member of the hedge trimmer in accordance with present teachings.

With reference to FIGS. 3 and 5, the first housing member 40 and the second housing member 42 can cooperate to from an aperture 90 through which the cutting arm member 52 of the hedge trimmer 12 can be inserted. With reference to FIG. 9, the blade guard 10 through the aperture 90 can slide over the cutting arm member 52 and the cutting blades 20. With reference to FIGS. 6 and 8, the blade guard 10 can, when in the closed condition, completely cover both sets 60, 62 of the cutting blades 20 and the cutting arm member 52 of the hedge trimmer 12. In one example, an end portion 92 of the blade guard 10 adjacent to the aperture 90 can abut a portion of the housing 58 of the hedge trimmer 12.

With reference to FIG. 7, when the blade guard 10 is in the open condition, a user 100 (FIG. 1) can remove the hedge trimmer 12 from the blade guard 10. The user 100 can then insert the first set 60 of the cutting blades 20 or the second set 62 of the cutting blades 20 into the attachment groove 30, as shown in FIG. 3. With reference to FIG. 5, the attachment groove 30 can define an elongated channel 102 along one side of the blade guard 10 that can be formed in the second housing member 42. It will be appreciated in light of the disclosure that the attachment groove 30 can be formed on the first housing member 40 in lieu of (or in addition to) the second housing member 42.

The attachment groove 30 can further include one or more connecting members 104 that can be adjacent to the attachment groove 30. The one or more connecting members 104 can generate a magnetic field. In one example, the one or more connecting members 104 can be one or more magnets 106 that can be affixed to the second housing member 42 of the blade guard 10. The one or more magnets 106 can be configured to releasably connect to the cutting arm member 52 and thus can secure the first set 60 of the cutting blades 20 (or the second set 62 of the cutting blades 20) within the attachment groove 30. The attachment groove 30 may contact and hold the first set 60 or the second set 62 of the cutting blades 20 in the attachment groove in addition to the releasable connection between the connecting members 104 and the cutting arm member 52. The attachment groove 30 can also just cover the first set 60 or the second set 62 of the cutting blades 20 while only relying on the connecting members 104 to releasably secure the blade guard 10 to the cutting arm member 52.

Figure 2:
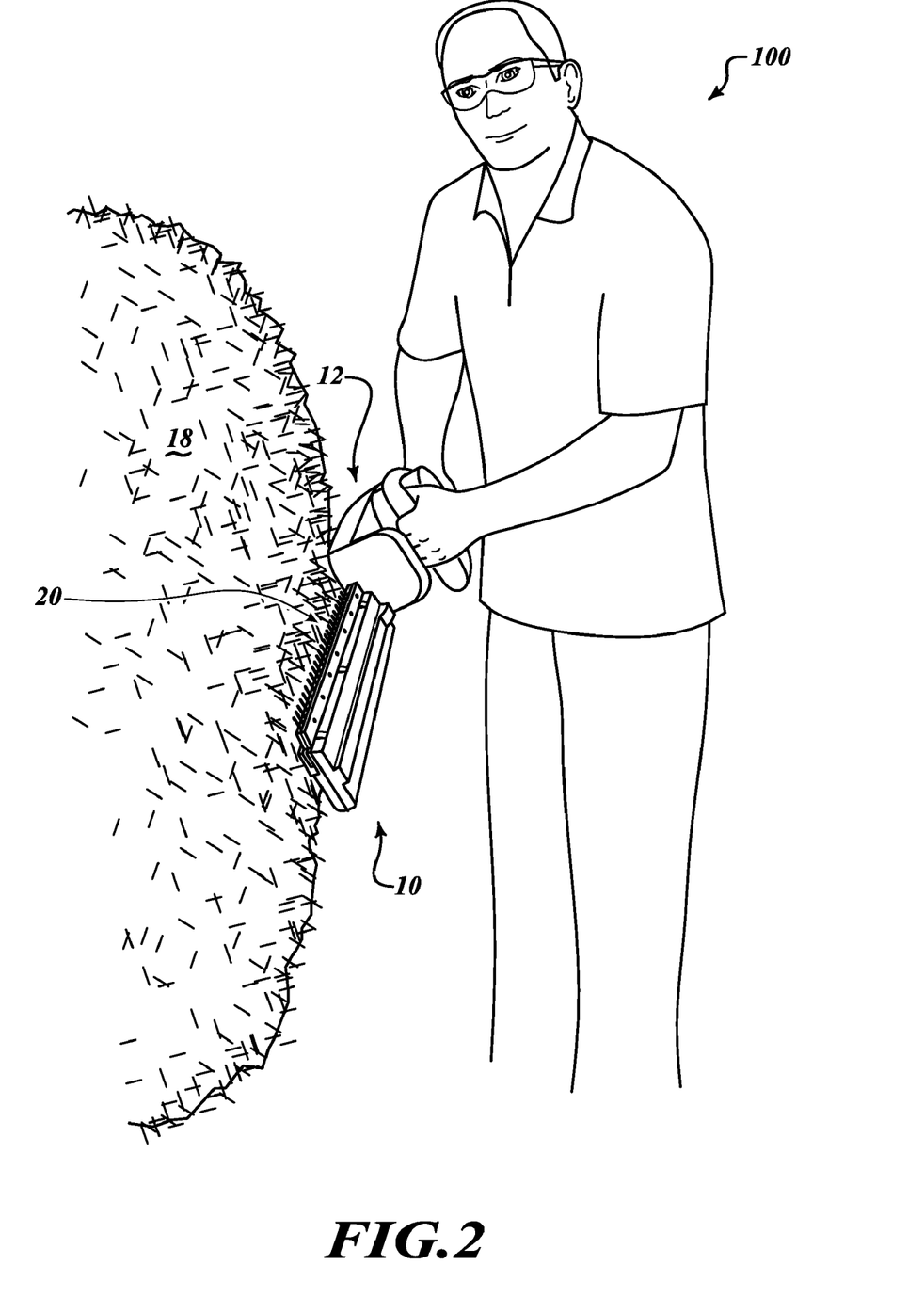
FIG. 2 is a perspective view of the user using the hedge trimmer to trim the hedge with the blade guard in a closed condition in accordance with the present teachings.

In this arrangement, the user 100 (FIG. 1) can keep the blade guard 10 in the open condition and can have the blade guard 10 attached to the first set 60 of the cutting blades 20 on the hedge trimmer 12. To this end, the user 100 can use the hedge trimmer 12 to trim the hedge 18 or other greenery and the clippings 16 can be caught in the scoop 14 established by the opening 32 formed by the blade guard 10 while in the open condition, as illustrated in FIG. 1. It will be appreciated in light of the disclosure that the open condition of the blade guard 10 can provide the scoop 14 because the first and the second housing members 40, 42 provide a v-shape 110. The v-shape 110 can provide the opening 32 that ultimately can serve as the scoop 14. The blade guard 10 can catch the clippings 16 from the hedge 18 or other greenery in the scoop 14 while the first set 60 of the cutting blades 20 of the hedge trimmer 12 can be kept within the attachment groove 30 of the blade guard 10. As illustrated in FIG. 2, the user 100 need not use the blade guard 10 in the open condition.

With reference to FIG. 5, the first housing member 40 of the blade guard 10 can include one or more latch members 112 that can secure to one or more respective flanges 114 that can extend from the second housing member 42. The one or more latch members 112 can connect to the one or more flanges 114, respectively, and can overcome a spring force generated by the one or more springs 48 that can be associated with the one or more hinge members 44 of the blade guard 10. By doing so, the user 100 (FIG. 1) can latch the blade guard 10 closed and thus can keep the blade guard 10 in its closed condition. It will be appreciated in light of the disclosure that the blade guard 10 can be placed into the closed condition or placed into the open condition whether the hedge trimmer is or is not contained within the opening 32 of the blade guard 10.

With reference to FIGS. 4 and 8, the one or more hinge members 44 can include a first block member 120 and a second block member 122. The first block member 120 can be formed on the first housing member 40 and the second block member can be formed on the second housing member 42. The first block member 120 can have an abutting surface 124 and the second block member 122 can have an abutting surface 126. When the blade guard 10 is in the closed condition (FIG. 8), the abutting surfaces 124, 126 on the first and second block members 120, 122, respectively, are spaced from one another. When the blade guard 10 is in the open condition (FIG. 4), the abutting surfaces 124, 126 on the first and second block members 120, 122, respectively, come into contact with one another. When the abutting surfaces 124, 126 contact one another, the blade guard 10 can be held in the open condition. The one or more spring members 48 can maintain the abutting surfaces 124, 126 in contact with each other.

With reference to FIG. 4, the first block member 120 and the second block member 122 can be configured to hold the blade guard 10 in the open condition so that the first housing member 40 and the second housing member 42 can be held apart from one another at the angle 46. Because the abutting surface 124 can contact the abutting surface 126 (or vice versa) and stop the pivotal movement of the first and second housing members 40, 42 about the hinge member 44, a dimension 128 (FIG. 8) between the abutting surfaces 124, 126 can be adjusted to provide various values of the angle 26 between the first housing member 40 and the second housing member 42, when the blade guard 10 is in the open condition.

With reference to FIG. 4, the blade guard 10 can have a front side 130 and a rear side 132. The aperture 90 can be formed on the rear side 132. The blade guard 10 can also have a first side 134 where the first and second housing members 40, 42 can pivotally couple. The first and second housing members 40, 42 can also have a second side 136 where the first and second housing members 40, 42 can latch together with the one or more latch members 112. The second side 136 can also include the attachment groove 30 on the second housing member 42.

With reference to FIG. 9, the blade guard 10 can be slid over the cutting arm member 52 and the cutting blades 20. The blade guard 10 can slide over the cutting arm member 52 and the cutting blades 20 while the blade guard 10 is in the closed condition. In this regard, the cutting arm member 52 and the cutting blades 20 can be inserted into the aperture 90. The blade guard 10 can be advanced along the cutting arm member 52 and the cutting blades 20 until the end portion 92 of the blade guard 10 abuts or comes close to contacting the housing 58 of the hedge trimmer 12. The hedge trimmer 12 can be removed from the blade guard 10 either by opening the blade guard 10 and removing the hedge trimmer 12 or by sliding the hedge trimmer 12 out of the blade guard 10 through the aperture 90.

The cutting arm member 52 and the cutting blades 20 can be retained in the blade guard 10 using friction provided by the interior surfaces 72, 82 (FIG. 8) of the blade guard 10 contacting the cutting arm member 52 and the cutting blades 20. The blade guard 10 can also be slid over the cutting arm member 52 and the cutting blades 20 while the blade guard 10 is in the open condition albeit the cutting blades 20 and the cutting arm members 52 would contact only a portion of the aperture 90.

With reference to FIGS. 10, 11 and 12, a hedge trimmer 200 can have a first set 202 of the cutting blades 204 and, as such, the hedge trimmer lacks additional sets of the cutting blades 204 in contrast to the hedge trimmer 12 having the first set 60 and the second set 62 of the cutting blades 20, as shown in FIG. 7. The hedge trimmer 200 can similarly include a gasoline powered or electric powered motor 210 that can cause some of the cutting blades 204 on a cutting arm member 212 to move. In this regard, the cutting blades 204 can include multiple fixed cutting blades 214 disposed among multiple moving blades 216 (FIG. 11), as is known in the art. As the multiple moving blades 216 move relative to the fixed blades 214, portions of the hedge 18 (FIG. 1) or other greenery can be cut between the cutting blades 204. Each of the moving blades 216 and the fixed blades 214 are operably connected to the cutting arm member 212 that can extend from a housing 218 of the hedge trimmer 200

In an exemplary method and with reference to FIG. 12, all of the cutting blades 20 of the hedge trimmer 12 can be removed from the opening 32 of the blade guard 10. It will be appreciated in light of the disclosure that the hedge trimmer 12 can be removed from the blade guard 10 by lifting the hedge trimmer 12 out of the opening 32 of the blade guard 10 while the blade guard 10 is in the open condition or by sliding the blade guard 10 off the cutting arm members 52 and the cutting blades 20.

Figure 13:
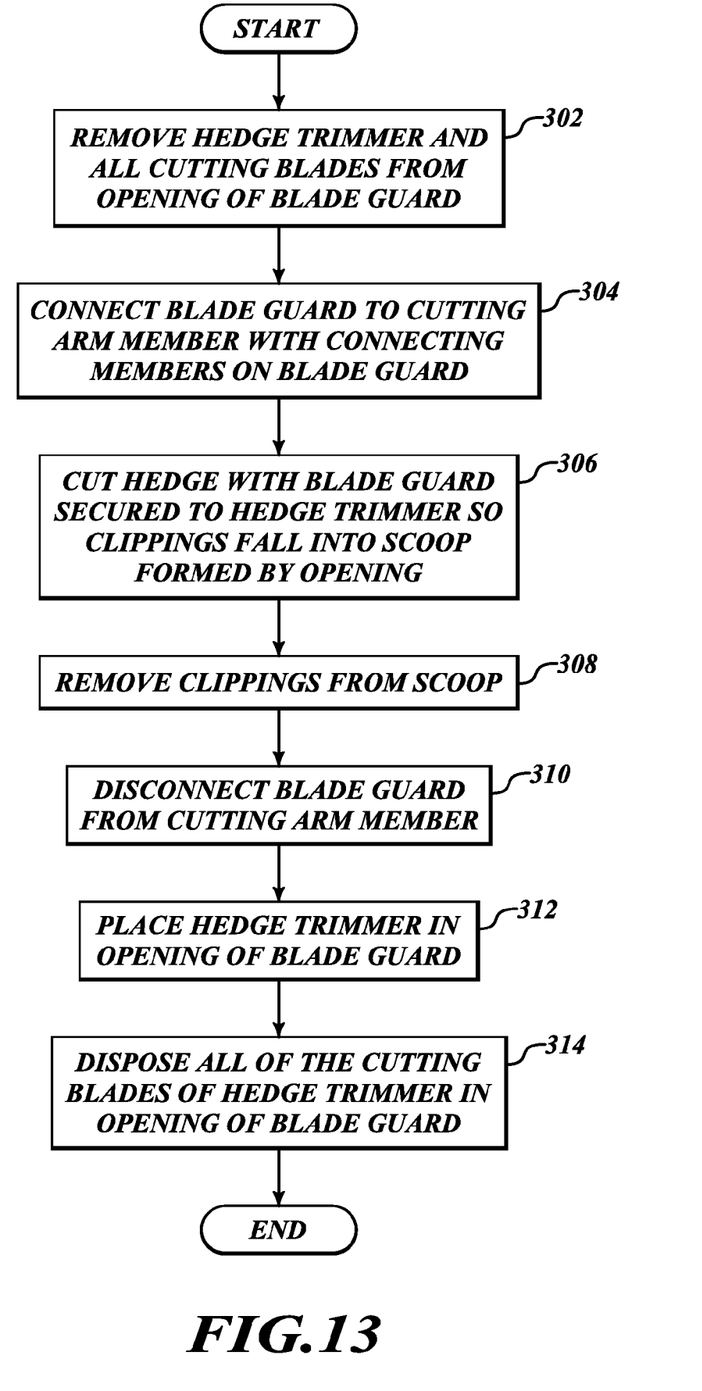
FIG. 13 is a flowchart illustrating an exemplary method of using the blade guard in accordance with the present teachings.

In box 304, the user 100 can connect to the cutting arm member 52. In this regard, the one or more connecting members 104 can releasably couple to the cutting arm member 52. When the hedge trimmer 12 has the first set 60 and the second set 62 of the cutting blades 20, the first set 60 or the second set 62 can be retained in the attachment groove 30. When the hedge trimmer 200 has only the first set 202 of the cutting blades 204, the blade guard 10 can just attach to the cutting arm member 212 without retaining any of the cutting blades 204 in the attachment groove. In box 306, the user 100 can cut the hedge 18 or other greenery with the blade guard 10 in the open condition while connected to the hedge trimmer 12. In box 308, the user 100 can remove the clippings 16 from the scoop 14 of the blade guard 10.

In box 310, the user 100 can disconnect the cutting arm member 52 of the hedge trimmer 12 from the blade guard 10 without any tools. In one example, the user 100 can pull the cutting arm member 52 of the hedge trimmer 12 away from the one or more connecting members 104. By way of the above example, the user 100 can overcome the magnetic force that can be established by the one or more connecting members 104 that can otherwise couple the cutting arm member 52, 212 to the blade guard 10.

In box 312, the user 100 can return the hedge trimmer 12 to the blade guard 10. While the blade guard 10 is in the open condition, the user can place the hedge trimmer 12 into the blade guard 10. While the blade guard 10 is in the closed condition, the hedge trimmer 12 can be inserted in the aperture 90 of the blade guard 10. In box 314, the user 100 can insert the cutting arm member 52 of the hedge trimmer 12 into the opening 32 or the aperture 90 of the blade guard 10 such that all of the cutting blades 20 of the hedge trimmer 12 can ultimately reside within the blade guard 10.

While specific aspects have been described in the specification and illustrated in the drawings, it will be understood by those skilled in the art that various changes can be made and equivalents can be substituted for elements and components thereof without departing from the scope of the present teachings, as defined in the claims. Furthermore, the mixing and matching of features, elements, components and/or functions between various aspects of the present teachings are expressly contemplated herein so that one skilled in the art will appreciate from the present teachings that features, elements, components and/or functions of one aspect of the present teachings can be incorporated into another aspect, as appropriate, unless described otherwise above. Moreover, many modifications may be made to adapt a particular situation, configuration or material to the present teachings without departing from the essential scope thereof. Therefore, it is intended that the present teachings not be limited to the particular aspects illustrated by the drawings and described in the specification as the best mode presently contemplated for carrying out the present teachings, but that the scope of the present teachings include many aspects and examples following within the foregoing description and the appended claims.

What is claimed is:

1. A method of using a blade guard with a hedge trimmer that has at least a first set of the cutting blades that extends from a cutting arm member and that cut trimmings from a hedge, the method comprising:
   removing the hedge trimmer from the blade guard;
   connecting the cutting arm member to a connecting member on the blade guard;
   moving the blade guard to an open condition to establish an opening between a first housing member and a second housing member of the blade guard that is operable to catch the trimmings cut by the first set of the cutting blades;
   disconnecting the cutting arm member from the connecting member on the blade guard;
   disposing the first set of the cutting blades within the blade guard.

2. The method of claim 1, wherein the removing of the hedge trimmer from the blade guard includes sliding the cutting arm member out of an aperture formed in the blade guard when the blade guard is in a closed condition.

3. The method of claim 1, wherein the removing of the hedge trimmer from the blade guard includes lifting the cutting arm member out of the opening of the blade guard when the blade guard is in an open condition.

4. The method of claim 1, wherein the disposing of the first set of the cutting blades within the blade guard includes disposing the first set of the cutting blades between a side channel of the first housing member and a side channel of the second housing member and disposing the cutting arm member between a middle channel of the first housing member and a middle channel of the second housing member.

5. The method of claim 1, wherein the connecting of the cutting arm member to a connecting member on the blade guard includes inserting a second set of the cutting blades into an attachment groove on the blade guard, wherein the second set of the cutting blades extend laterally from the cutting arm member and opposite the first set of the cutting blades.

6. A blade guard for a hedge trimmer that can cut trimmings from a hedge, the hedge trimmer including a cutting arm member with at least a first set of cutting blades that extends laterally from the cutting arm member, the blade guard comprising:
   a first housing member and a second housing member movable between an open condition and a closed condition;
   a connecting member on the blade guard operable to releasably couple to the cutting arm member of the hedge trimmer, wherein said first housing member and said second housing member in said open condition establish an opening between said first housing member and said second housing member, wherein the blade guard in said open condition is operable to catch the trimmings in said opening between said first housing member and said second housing member, wherein the blade guard in said closed condition is operable to cover the first set of the cutting blades; and
   a hinge member including a first block member and a second block member,
   wherein said first block member includes a first abutting surface and said second block member includes a second abutting surface, wherein said hinge member obstructs movement of said first housing member toward said second housing member when said first abutting surface contacts said second abutting surface as the blade guard moves from said closed condition to said open condition.

7. The blade guard of claim 6 further comprising:
   a middle channel disposed adjacent a first side channel that is formed in an interior of said first housing member;
   a middle channel disposed adjacent a first side channel that is formed in an interior of said second housing member,
   wherein the blade guard in said closed condition is operable to cover the first set of the cutting blades between said first side channels of each of said first and second housing members,
   wherein the blade guard in said closed condition is operable to cover the cutting arm member between said middle channels of said first and second housing members.

8. The blade guard of claim 7 further comprising:
   a second side channel disposed adjacent said middle channel and opposite said first side channel that is formed in said interior of said first housing member;
   a second side channel disposed adjacent said middle channel and opposite said first side channel that is formed in said interior of said second housing member;
   wherein the blade guard in said closed condition is operable to cover a second set of the cutting blades between said second side channels of each of said first and second housing members,
   wherein the second set of the cutting blades extends laterally from the cutting arm member and opposite the first set of the cutting blades.

9. The blade guard of claim 6 further comprising:
   a spring member associated with said hinge member, wherein said spring member biases the blade guard in said open condition.

10. The blade guard of claim 6 further comprising:
    an aperture formed cooperatively by a rear side of said first housing member and a rear side of said second housing member,
    wherein said aperture is operable to receive the cutting arm member by sliding the cutting arm member of the hedge trimmer into said aperture to contain the cutting blades of the hedge trimmer within the blade guard.

11. The blade guard of claim 10 further comprising:
    a latch member that locks the blade guard in said closed condition,
    wherein the blade guard is operable to receive the cutting arm member and the cutting blades of the hedge trimmer within the blade guard when the blade guard is locked in said closed condition by said latch member.

12. The blade guard of claim 6 further comprising:
    an attachment groove formed in the blade guard adjacent said connecting member, wherein said attachment groove is operable to receive a second set of the cutting blades that extend laterally from the cutting arm member and opposite the first set of the cutting blades.

13. A blade guard for a hedge trimmer that has a cutting arm member with at least a first set of cutting blades that extends laterally from a cutting arm member, the blade guard comprising:
- a housing including a first housing member and a second housing member,
- wherein a first side of said first housing member is pivotally coupled to a first side of said second housing member,
- wherein said first and second housing members are movable between a closed condition defining at least a second side of said first housing member being coupled to a second side of said second housing member and an open condition defining at least said second sides being spaced apart to establish an opening between said first and second housing members;
- a middle channel disposed adjacent a first side channel that is formed in an interior of said first housing member;
- a middle channel disposed adjacent a first side channel that is formed in an interior of said second housing member,
- wherein the blade guard in said closed condition is operable to cover the first set of the cutting blades between said first side channels of each of said first and second housing members;
- a connecting member on said second side of said second housing member,
- wherein said connecting member is operable to releasably couple said second housing member to the cutting arm member of the hedge trimmer,
- wherein the blade guard in said open condition is operable to provide said opening below the first set of the cutting blades when said connecting member is coupled to the cutting arm member.

14. The blade guard of claim 13 further comprising:
- a second side channel disposed adjacent said middle channel and opposite said first side channel that is formed in said interior of said first housing member;
- a second side channel disposed adjacent said middle channel and opposite said first side channel that is formed in said interior of said second housing member,
- wherein the blade guard in said closed condition is operable to cover a second set of the cutting blades between said second side channels of each of the first and second housing members,
- wherein the second set of the cutting blades extends laterally from the cutting arm member and opposite the first set of the cutting blades.

15. The blade guard of claim 13 further comprising:
- a hinge member including a first block member and a second block member,
- wherein said first block member includes a first abutting surface and said second block member includes a second abutting surface,
- wherein said hinge member obstructs pivotal movement of said first housing member relative to said second housing member when said first abutting surface contacts said second abutting surface as the blade guard moves from said closed condition to said open condition.

16. The blade guard of claim 15, further comprising a spring member associated with said hinge member that biases the blade guard in said open condition.

17. The blade guard of claim 13 further comprising:
- an aperture formed cooperatively by a rear side of said first housing member and a rear side of said second housing member,
- wherein said aperture is operable to receive a portion of the cutting arm member to slide the blade guard over the cutting arm member of the hedge trimmer,
- wherein said aperture is disposed between said first side and said second side of said first and second housing members, respectively.

18. The blade guard of claim 13 further comprising:
- an attachment groove formed in the blade guard adjacent said connecting member,
- wherein said attachment groove is operable to receive a second set of the cutting blades that extend laterally from the cutting arm member and opposite the first set of the cutting blades.

19. A blade guard for a hedge trimmer that can cut trimmings from a hedge, the hedge trimmer including a cutting arm member with at least a first set of cutting blades that extends laterally from the cutting arm member, the blade guard comprising:
- a first housing member and a second housing member movable between an open condition and a closed condition;
- a connecting member operable to releasably couple to the cutting arm member of the hedge trimmer, said first housing member and said second housing member establish an opening therebetween when in said open condition, said first housing member and said second housing member are operable to catch the trimmings in said opening, said first housing member and said second housing member are operable to cover the first set of the cutting blades when in said closed condition;
- a latch member that locks said first housing member and said second housing member in said closed condition, said first housing member and said second housing member are operable to receive the cutting arm member and the cutting blades of the hedge trimmer when said first housing member and said second housing member are locked in said closed condition by said latch member;
- a middle channel disposed adjacent a first side channel that is formed in an interior of said first housing member;
- a middle channel disposed adjacent a first side channel that is formed in an interior of said second housing member,
- wherein said first side channels of each of said first and second housing members are operable to cover the first set of the cutting blades when in said closed condition,
- wherein said middle channels of the first and second housing members are operable to cover the cutting arm member in said closed condition.

20. The blade guard of claim 19 further comprising
- a second side channel disposed adjacent the middle channel and opposite the first side channel that is formed in said interior of said first housing member;
- a second side channel disposed adjacent said middle channel and opposite said first side channel that is formed in said interior of said second housing member,
- wherein said second side channels of each of said first and second housing members are operable to cover a second set of the cutting blades when in said closed condition,
- wherein the second set of the cutting blades extends laterally from the cutting arm member and opposite the first set of the cutting blades.

21. A blade guard for a hedge trimmer that can cut trimmings from a hedge, the hedge trimmer including a cutting arm member with at least a first set of cutting blades that extends laterally from the cutting arm member, the blade guard comprising;
- a first housing member and a second housing member movable between an open condition and a closed condition;
- a connecting member operable to releasably couple to the cutting arm member of the hedge trimmer, said first housing member and said second housing member establish an opening therebetween when in said open condition, said first housing member and said second housing member are operable to catch the trimmings in said opening, said first housing member and said second housing member are operable to cover the first set of the cutting blades when in said closed condition;
- a latch member that locks said first housing member and said second housing member in said closed condition, said first housing member and said second housing member are operable to receive the cutting arm member and the cutting blades of the hedge trimmer when said first housing member and said second housing member are locked in said closed condition by said latch member; and
- a hinge member including a first block member and a second block member, said first block member includes a first abutting surface and said second block member includes a second abutting surface, said hinge member obstructs movement of said first housing member toward said second housing member when said first abutting surface contacts said second abutting surface.

22. The blade guard of claim 21 further comprising a spring member associated with said hinge member, the spring member biases said first housing member and said second housing member into said open condition.

23. A blade guard for a hedge trimmer that can cut trimmings from a hedge, the hedge trimmer including a cutting arm member with at least a first set of cutting blades that extends laterally from the cutting arm member, the blade guard comprising;
- a first housing member and a second housing member movable between an open condition and a closed condition, wherein an aperture is formed cooperatively by a rear side of said first housing member and a rear side of said second housing member, said aperture is operable to receive the cutting arm member by sliding the cutting arm member of the hedge trimmer into said aperture to contain the cutting blades of the hedge trimmer between said first housing member and said second housing member;
- a connecting member operable to releasably couple to the cutting arm member of the hedge trimmer, said first housing member and said second housing member establish an opening therebetween when in said open condition, said first housing member and said second housing member are operable to catch the trimmings in said opening, said first housing member and said second housing member are operable to cover the first set of the cutting blades when in said closed condition; and
- a latch member that locks said first housing member and said second housing member in said closed condition, said first housing member and said second housing member are operable to receive the cutting arm member and the cutting blades of the hedge trimmer when said first housing member and said second housing member are locked in said closed condition by said latch member.

24. A blade guard for a hedge trimmer that can cut trimmings from a hedge, the hedge trimmer including a cutting arm member with at least a first set of cutting blades that extends laterally from the cutting arm member, the blade guard comprising:
- a first housing member and a second housing member movable between an open condition and a closed condition;
- a connecting member operable to releasably couple to the cutting arm member of the hedge trimmer, said first housing member and said second housing member establish an opening therebetween when in said open condition, said first housing member and said second housing member are operable to catch the trimmings in said opening, said first housing member and said second housing member are operable to cover the first set of the cutting blades when in said closed condition;
- an attachment groove adjacent said connecting member and operable to receive a second set of the cutting blades that extend laterally from the cutting arm member and opposite the first set of the cutting blades; and
- a latch member that locks said first housing member and said second housing member in said closed condition, said first housing member and said second housing member are operable to receive the cutting arm member and the cutting blades of the hedge trimmer when said first housing member and said second housing member are locked in said closed condition by said latch member.

* * * * *